J. A. CARRUTH.

Perforator for Printing-Presses.

No. 8,646. Reissued April 1, 1879.

Witnesses:

W Tweeddale

A M Coville

Inventor:

J A Carruth

UNITED STATES PATENT OFFICE.

JAMES A. CARRUTH, OF TOPEKA, KANSAS.

IMPROVEMENT IN PERFORATORS FOR PRINTING-PRESSES.

Specification forming part of Letters Patent No. 193,482, dated July 24, 1877; Reissue No. 8,646, dated April 1, 1879; application filed October 9, 1878.

*To all whom it may concern:*

Be it known that I, JAMES A. CARRUTH, of Topeka, Shawnee county, State of Kansas, have invented a new and Improved Perforator for Printing-Presses, of which the following is a specification:

My invention relates to a new and improved device for perforating paper, &c., simultaneous with the printing on a job-press, so that it may be easily separated along the line of perforation.

The invention consists in providing a finger with serrated or notched edge, one end of which finger is of such shape as to be easily attached to the frame or rod that carries the nippers on a job printing-press.

Figure 1:
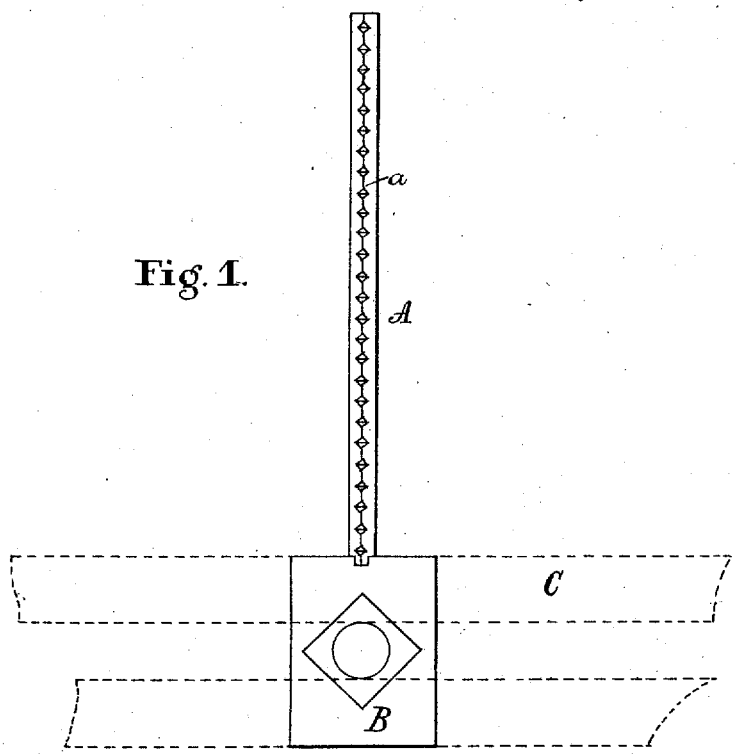
Figure 2:
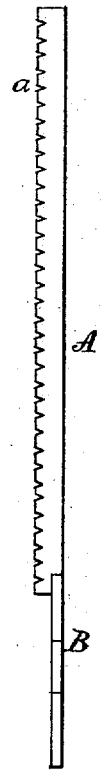

Figure 1 is a front elevation of my perforator, showing a part of the nipper-frame to which it is attached. Fig. 2 is a side elevation.

Similar letters of reference indicate corresponding parts.

Referring to the drawings, A is a perforator provided with a serrated cutting-edge, *a*, and an end piece, B, by which it is secured to the nipper-frame, a portion of which is indicated by C and shown by dotted lines.

The operation is as follows: The perforator is fastened to the nipper-frame and moves with the nippers, and when the paper and type come in contact the slug or piece of furniture in the form engages the perforator and forces the serrated edge into the paper.

Having fully described my invention, what I claim as new, and desire to secure by Letters Patent, is—

1. A nipper-finger with perforating-teeth arranged on edge *a*, substantially as and for the purpose specified.

2. A nipper-finger with serrated cutting-edge adapted, substantially as described, to be engaged by a slug or piece of furniture in the form and forced into the sheet.

JAMES A. CARRUTH.

Witnesses:
C. S. TREAT,
W. A. POTTER.